United States Patent
Hins

(10) Patent No.: US 9,140,126 B2
(45) Date of Patent: Sep. 22, 2015

(54) PROPELLER WITH REACTIONARY AND VACUUM FACES

(76) Inventor: Anthony V. Hins, Kindred, ND (US)

(*) Notice: Subject to any disclaimer, the term of this patent is extended or adjusted under 35 U.S.C. 154(b) by 515 days.

(21) Appl. No.: 13/555,166

(22) Filed: Jul. 22, 2012

(65) Prior Publication Data

US 2013/0028748 A1 Jan. 31, 2013

Related U.S. Application Data

(60) Provisional application No. 61/511,587, filed on Jul. 26, 2011.

(51) Int. Cl.
*B64C 11/18* (2006.01)
*B64C 27/467* (2006.01)
*F01D 5/14* (2006.01)

(52) U.S. Cl.
CPC .............. *F01D 5/141* (2013.01); *B64C 11/18* (2013.01); *B64C 27/467* (2013.01); *F05D 2220/324* (2013.01); *F05D 2220/325* (2013.01); *Y02T 50/673* (2013.01)

(58) Field of Classification Search
CPC ..... F05D 2250/13; B64C 11/16; B64C 11/18; B64C 11/22; B64C 11/24; B64C 27/46; B64C 27/467

USPC .................................. 244/62; 416/223 R, 235
See application file for complete search history.

(56) References Cited

U.S. PATENT DOCUMENTS

| 2,083,992 | A | * | 6/1937 | Hall | 416/220 R |
| 2,408,788 | A | * | 10/1946 | Ludington et al. | 416/23 |
| 2,996,120 | A | * | 8/1961 | McGregor | 416/227 R |
| 3,397,869 | A | * | 8/1968 | Webster | 366/327.1 |
| 3,887,300 | A | * | 6/1975 | Quinn | 416/210 R |
| 4,191,506 | A | * | 3/1980 | Packham | 416/91 |
| 4,408,957 | A | * | 10/1983 | Kurzrock et al. | 416/237 |
| 2009/0230235 | A1 | * | 9/2009 | McNulty | 244/17.23 |
| 2011/0176915 | A1 | * | 7/2011 | Keir et al. | 415/182.1 |

* cited by examiner

*Primary Examiner* — Edward Look
*Assistant Examiner* — Jason Davis
(74) *Attorney, Agent, or Firm* — Brainstorm Consulting, LLC; Jonathan L. Tolstedt

(57) ABSTRACT

A novel airfoil design comprising a reactionary front face that pushes into the flow of air with a high angle of attack and a vacuum-producing face which forces the early separation of the flow of air from the top side of the airfoil, creating an area of high negative pressure which pulls upward, contributing to lift.

6 Claims, 11 Drawing Sheets

PROPELLER WITH REACTIONARY AND VACUUM FACES

CROSS-REFERENCE TO RELATED PATENT APPLICATIONS

This patent application claims priority to U.S. Provisional Patent Application No. 61/511,587, entitled, "Sub-Supersonic Propeller," and filed on Jul. 26, 2011. The entire disclosure of the above-noted patent application is incorporated by reference in its entirety herein.

FIELD OF INVENTION

This invention relates generally to certain new and useful improvements in propeller designs, and, more particularly, to a propeller design having a reactionary front face with a high angle of attack and a vacuum-producing face opposing the front face.

BACKGROUND

Many years of research and study have gone into the creation of aerodynamic structures to improve their efficiency and capabilities. Unfortunately, much of this research has been based on underlying scientific principles and theories that have been taken for granted for too long as the only real solution to the problem, constraining the imagination of the designers unnecessarily. For example, the majority of existing airfoils today were designed with Bernoulli's principle in mind. In simple terms, this principle states that when the speed of a fluid increases, the pressure in that fluid decreases. In the case of an airfoil like a wing or the blade of a propeller, the fluid is air, and the airfoil is designed such that the flow of air speeds up when it flows over the top of the airfoil in relation to the speed of the air under the airfoil, decreasing the pressure above and generating lift (because the higher pressure under the airfoil pushes it up into the area of lower pressure).

These Bernoulli-inspired airfoils have worked well enough over the years, but they have their limitations, and there is really no way to make them any more efficient without departing from this traditional design entirely. One limitation on the traditional airfoil design is the speed at which it can be rotated when used on a propeller. These blades are typically rotated at about 2100 to 2500 RPM. If they are rotated much faster, then the tips of the blade start to approach the speed of sound, and once the sound barrier is broken, the resulting shock waves cause disruption in the air flow and reduce the lift generated by the airfoil design. Some aircraft with more powerful engines actually have to use a gear reduction system to make sure the propellers are not rotated too fast to avoid this problem. This is a limitation on the power that could be achieved by today's more powerful engines.

The traditional airfoil design to angle of attack (the angle at which the airfoil is mounted in relation to the direction of travel), airfoil shape, and the speed at which the airfoil is flown. If the traditional airfoil of the prior art is flown at too high of an angle of attack, the flow of air over the top of the airfoil separates from the airfoil surface and lift is greatly reduced. If the airfoil is not shaped properly, the flow of air is disrupted and lift is affected. As the speed of the airfoil through air is increased, its critical angle of attack is decreased; that is, the angle at which the airfoil begins to lose lift is lowered so lift is lost sooner.

Some inventors have tried to improve the traditional airfoil design in the past but with little success. U.S. Pat. No. 4,191,506 by Packham describes one such attempt. Packham describes a propeller design with hollow blades with a triangular cross-section. Unlike traditional airfoil designs, Packham shows the front face of his airfoil pushing into the flow of air with a relatively high angle of attack, and does not depend on a curved top on his airfoil to generate lift. Packham describes the airfoil as being constructed from sheet material such that the blades themselves can be hollow and can help direct air through the blades and out the back side of the rotating blades to help eliminate areas of turbulence behind the blade.

Although the use of a triangular cross section is similar to one aspect of the present invention, that is, in the use of a "reactionary face" that impacts the flow of air and pushes it down, Packham has not shown any data to support the performance of the hollow blades with holes and how they affect air flow and aerodynamics. Finally, Packham's airfoil design is only utilizing one face of the triangular blade to generate lift, while it will be shown that the present invention offers a significant improvement over Packham's airfoil by utilizing both a reactionary front face to push air down (to generate an upward force on the airfoil by Newton's Third Law of Motion) as well as a vacuum producing face on the opposite side of the blade (to generate a region of high negative pressure that pulls the blade upward, reinforcing and increasing the upward lifting force).

Other attempts have been made to improve the traditional airfoil design, but none are as relevant to the present invention as Packham. Other prior art devices describe minor modifications to traditional airfoil designs which are not similar in concept to the present invention, or describe methods of construction, novel materials, etc., not pertinent to the present invention. All of these prior art devices suffer from the same limitations and constraints previously described for traditional, Bernoulli-inspired airfoils above.

What is needed in the art is a novel airfoil design which avoids the constraints and limitations of the traditional Bernoulli-inspired airfoil designs of the prior art, offers significant improvements in performance and lift over the airfoil designs of the prior art, and which can be used on today's conventional aircraft without modification to the aircraft engine or fuselage.

SUMMARY

Accordingly, it is one objective of the present invention to describe an airfoil comprising a reactionary face, a top face, a vacuum-producing face, and a back face, wherein the reactionary face is positioned with a high angle of attack on the side of the airfoil that first pushes into the flow of air when the airfoil is moving, creating an impact of the flow of air with the reactionary face which causes the flow of air to be deflected downward, generating an opposite lifting force on the airfoil in an upward direction; wherein the top face is positioned adjacent to the first side, parallel to the flow of air, facing in the direction the opposite lifting force is acting; wherein the vacuum-producing face is positioned adjacent to the second side, at an angle such that as the flow of air separates from the surface as it passes from the transition from the second side to the third side, generating an area of high negative pressure immediately above the third side, generating an additional reinforcing lifting force on the airfoil; and wherein the back face is positioned on a fourth side of the airfoil, between the vacuum-producing face and the reactionary face, is substantially vertical, and is facing in a direction opposite of and substantially perpendicular to the flow of air.

It is another objective of the present invention to describe a propeller that takes advantage of the above described airfoil design.

Further objectives and advantages of the invention will become apparent from a consideration of the drawings and ensuing description.

DESCRIPTION OF THE DRAWINGS

FIGS. 1A through 4 are provided to show illustrative examples from the prior art.

[PRIOR ART] FIG. 1A is a side view of a cross-section of an aircraft wing or airfoil from the prior art showing how air flow across this traditional surface generates lift.

[PRIOR ART]

[PRIOR ART]

[PRIOR ART] FIG. 3 is a front view of a single airfoil from the prior art illustrated with diagrams showing the cross-sectional shape at different points along the blade, showing that the angle of attack of each cross section increases as the cross section moves closer to the center or hub of the propeller.

[PRIOR ART] FIG. 4 is a front view of a full propeller from the prior art illustrating that the outer most parts of a blade have to rotate faster than the inner most parts of a blade, as they have a greater distance to travel for each revolution of the propeller.

FIG. 5 shows a cross section of one embodiment of a new airfoil design of the present invention in which the blade design has a reactionary front face which pushes into the air to create positive pressure on the front face when the air strikes the front face.

FIG. 6 shows a cross section of a second embodiment of a new airfoil design of the present invention in which the blade design has a reactionary front face but which eliminates an area of negative pressure that constrained the design shown in FIG. 5.

FIG. 7 shows a cross section of the preferred embodiment of a new airfoil design of the present invention, in which the blade design has a reactionary front face which pushes into the air to create positive pressure on the front face when the air strikes the front face, and a vacuum-producing face opposing the front face which creates a region of high negative pressure in a direction which reinforces the positive pressure created on the reactionary face, thereby maximizing the lift generated.

FIG. 8 is a front view of the preferred embodiment of a new propeller design of the present invention.

FIG. 9 is a side view of the preferred embodiment of a new propeller design of the present invention as it might be mounted on an aircraft in front of the engine cowl.

FIG. 10 is a perspective view of the preferred embodiment of a new propeller design of the present invention.

DETAILED DESCRIPTION

Figure 1A:
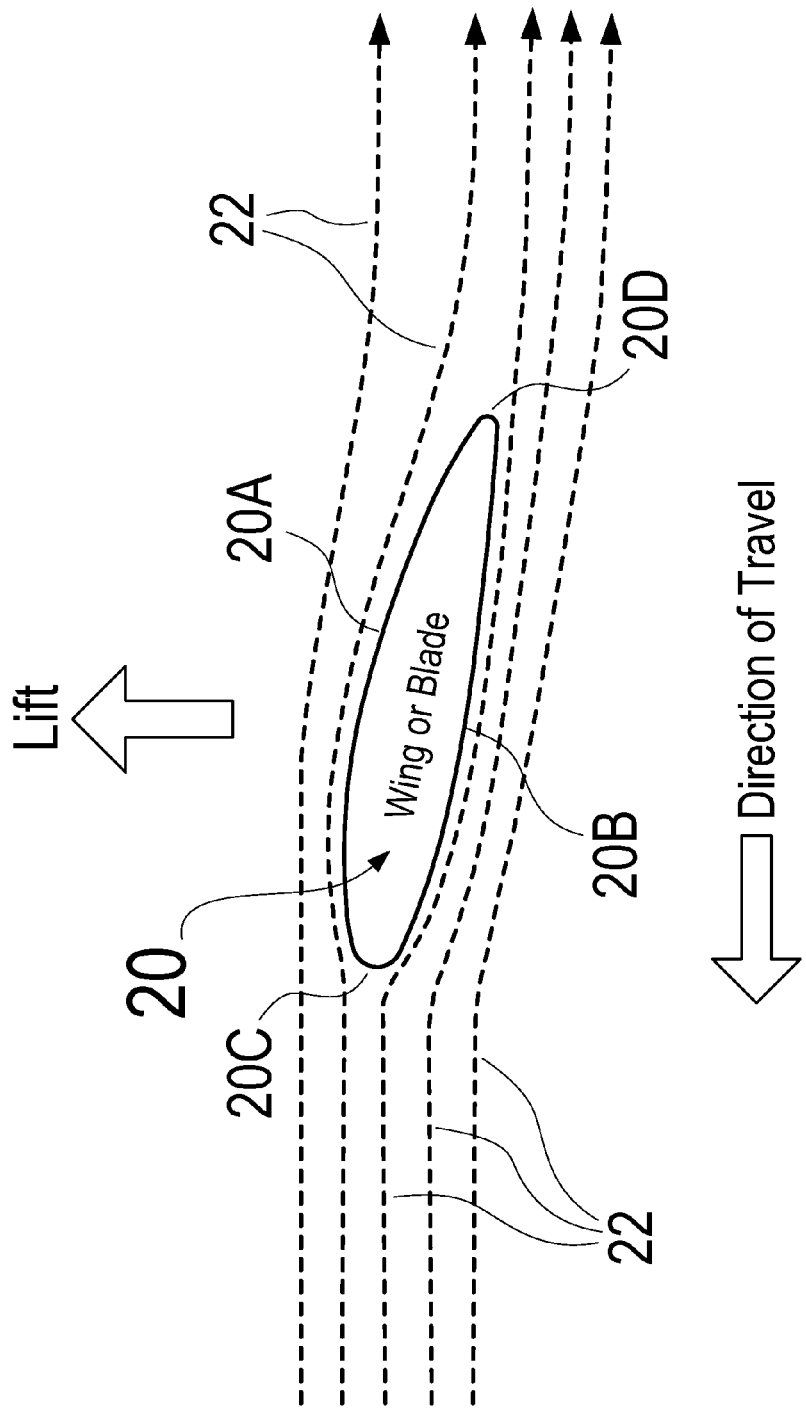

Referring now to FIGS. 1A through 10, a new propeller design having a reactionary front face with a high angle of attack and a vacuum-producing face opposing the front face will be described. FIGS. 1A through 4 are provided to show illustrative examples from the prior art. FIGS. 5 through 10 are provided to describe the present invention, which is a new propeller design with advantages over the propellers of the prior art as will be described shortly.

For the following discussion of airfoil (propeller and wing) designs of the prior art, as well as the discussion of the propeller design of the present invention, it is important to have an understanding of what makes a traditional aircraft wing or propeller design of the prior art fly. Those skilled in the art will know that this introduction to traditional airfoil and wing design is greatly simplified and that the actual theory is much more complex, but the intent is to provide enough background to enable a logical presentation of the present invention.

Two scientific theories are most often used to try to explain how a traditional airfoil or wing design works: the Bernoulli principle and Newton's law of action and reaction. Individuals who do not understand either theory well often argue about which one better explains how an aircraft flies, but, in fact, both theories are applicable.

Although it is often misquoted and misunderstood, Bernoulli's principle, stated simply, says that when the speed of a fluid increases, the pressure in the fluid decreases. When air moves across a traditional airfoil design from the prior art (or, perhaps more correctly, when the airfoil is moved through the air), the shape of the airfoil and the position of that airfoil relative to the flow of air will cause a difference in pressure to be generated between the upper and lower surfaces of the airfoil, and the airfoil will be pulled into the area of lower pressure. Please note that the terms "upper surface" and "lower surface" as used herein, and similar terms, are relative, as an airfoil may be positioned on its side in the case of a propeller mounted on the front of an airplane. For the purposes of this document, the terms "upper surface", "top surface" and "front surface" will be used interchangeably and will always refer to the side or surface of the airfoil on which lower pressure is generated, and "lower surface", "bottom surface", and "back surface" will similarly be used interchangeably and will always refer to the side or surface of the airfoil on which lower pressure is generated. This principle will be discussed and illustrated in the discussions of FIGS. 1A through 4 below.

Newton's Third Law of Motion, simply stated, is that for every action there is an equal and opposite reaction. This law and theory is used in the field of aerodynamics by some to explain lift by stating that by forcing the flow of air down (or back), the shape of the airfoil causes and equal and opposite reaction on the wing that pushes it in the opposite direction. This movement in the opposite direction is lift.

Most true experts in aerodynamics have come to see these two theories of lift, Bernoulli's principle and Newton's Third Law of Motion, not as competing theories but as statements of essentially the same underlying concepts, or at least aspects of the same concepts. There is a decrease in force on one side of a traditional airfoil design that contributes to lift, and there is also a reaction that is equal and opposite to the force on the air that helps move the airfoil. Both theories should be kept in mind for the following discussion. We refer now to FIG. 1A.

FIG. 1A is a side view of a cross-section of an aircraft wing or airfoil from the prior art showing how air flow across this traditional airfoil surface generates lift. An airfoil 20 such as an aircraft wing or the blade of a propeller is moved through a roughly horizontal flow of air 22. The leading edge 20C of the airfoil 20 is the edge that first encounters the air flow 22, and the air flow 22 is diverted either over the bottom surface 20B of the airfoil 20, or the top surface 20A. A typical airfoil design in the prior art is such that the top surface 20A is curved more than the bottom surface 20B, creating a path along the top surface 20A for the air flow 22 that is longer than the path on the bottom surface 20B. This airfoil shape, as well as the angle of attack (defined and discussed in FIG. 1B), that helps create a situation in which a lower pressure is created on the top surface 20A of the airfoil 20 relative to the pressure on the bottom surface 20B. As previously discussed, this pressure differential between the top surface 20A and bottom surface 20B contributes to a lift in the direction of the top surface 20A (as shown by the arrow marked "LIFT" in FIG. 1A). Near the trailing edge 20D of the airfoil 20, the airflow 22 begins to return to horizontal again, which can cause the airflow to pull away slightly from the trailing edge 20D, creating a small area of turbulence and loss of lift in the wake of the airfoil 20.

Figure 1B:
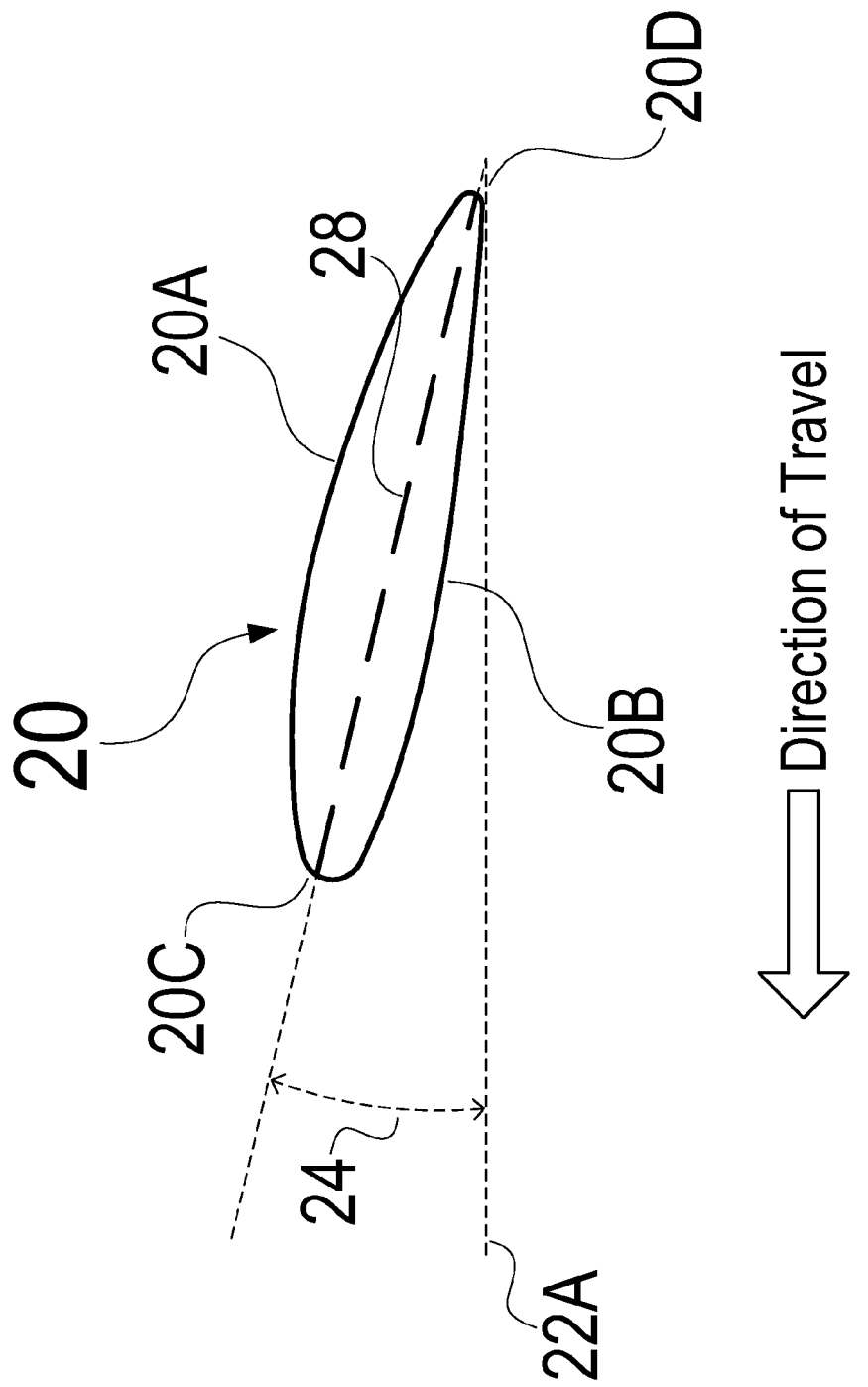
FIG. 1B is another side view of a cross-section of an aircraft wing or airfoil from the prior art illustrating the concept of "angle of attack" for discussion purposes.

FIG. 1B is another side view of a cross-section of an airfoil design from the prior art illustrating the concept of "angle of attack". For the purposes of this document, "angle of attack" shall be defined as the angle between the chord of an airfoil and the direction of the surrounding undisturbed flow of gas or liquid. Further, the term "chord" shall be defined as the imaginary straight line segment joining the center of curvature of the leading edge and the center of curvature of the trailing edge of the cross section of the airfoil. Referring now to FIG. 1B, we show chord 28 joining the leading edge 20C and trailing edge 20D of airfoil 20. The angle of attack for the prior art airfoil 20 shown in FIG. 1B is the angle 24 between the chord 28 and the direction of the flow of air 22A through which the airfoil 20 is moving. For the purposes of this example, the direction of the flow of air 22A is assumed to be perfectly horizontal. However, in reality, the direction of the flow of air 22A could be something other than horizontal, which would change the actual angle of attack 24.

Figures 2A, 2B, 2C:
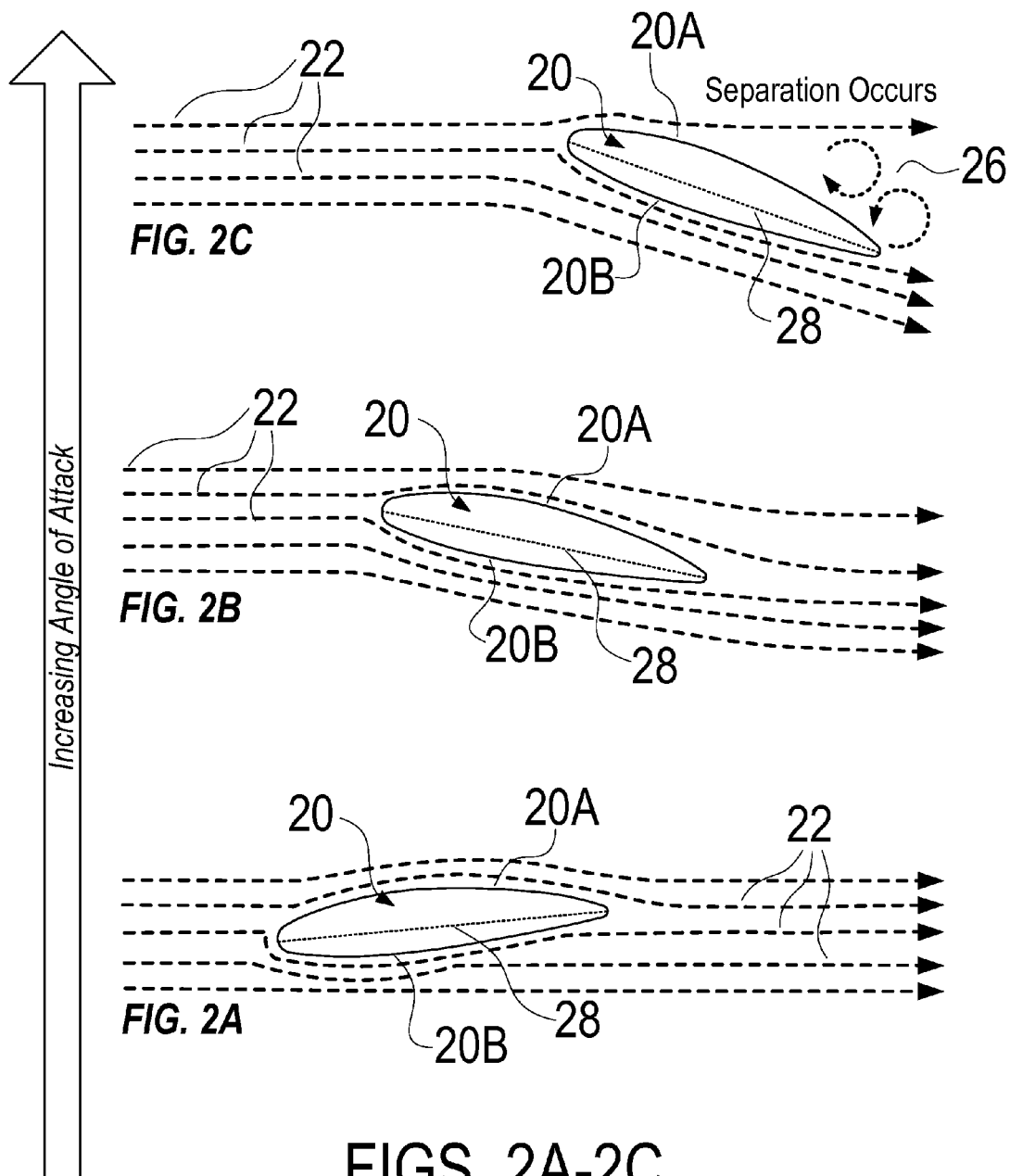
FIGS. 2A through 2C are additional side views of cross-sections of an aircraft wing or airfoil from the prior art illustrating how an increasing angle of attack will create increasing lift on the wing or blade until the point when the air flow is forced to separate from the top surface, creating a stall condition.

FIGS. 2A through 2C are additional side views of cross-sections of an airfoil design from the prior art illustrating how an increasing angle of attack will create increasing lift on the wing or blade until the point when the air flow is forced to separate from the top surface, creating a stall, or loss of lift, condition. FIG. 2A shows an airfoil 20 moving through a horizontal air flow 22 with a slightly negative angle of attack. In this configuration, the flow of air 22 moves somewhat equally over both top 20A and bottom 20B sides and of the airfoil 20, although the slightly more curved shape of the top side 20A may contribute slightly to upward force (lift).

In FIG. 2B, the angle of attack is increased such that the air more directly impacts the bottom side 20B of the airfoil 20 (contributing to lift through Newton's Third Law of Motion), and airflow over the top side 20A creates lower pressure thus contributing to greater upward force and greater lift (due to Bernoulli's principle). It is obvious to those skilled in the art of aerodynamics that increasing the angle of attack in this manner will continue to increase the amount of upward force, or life, that is generated, until the point that the flow of air over the top surface 20A of the airfoil 20 begins to separate significantly from the top surface 20A. At this point, the amount of lift generated drops dramatically, and the airfoil "stalls" (loses lift).

In FIG. 2C, the airfoil 20 has been increased to an angle of attack above the "critical" angle of attack (that is, the angle of attack wherein the flow of air 22 becomes more separated from the top surface 20A than is required to continue generating increasing lift) and a stall condition occurs. "Stall" occurs on an airfoil when an angle of attack above the critical angle of attack is reached, and the flow of air 22 separates from the top surface 20A of the airfoil 20, creating an area of turbulence 26. The area of turbulence 26 rotates downward, at least in part, and strikes the surface of the airfoil 20, thereby reducing lift.

When stall occurs, the ability of the airfoil 20 to generate lift drops significantly. The critical angle of attack varies depending on many factors, including the airfoil design, the speed of the airfoil relative to the air through which it is moving, and the weight of the aircraft, but a typical critical angle of attack is around 15 degrees for most fixed wing aircraft types.

Figure 3:
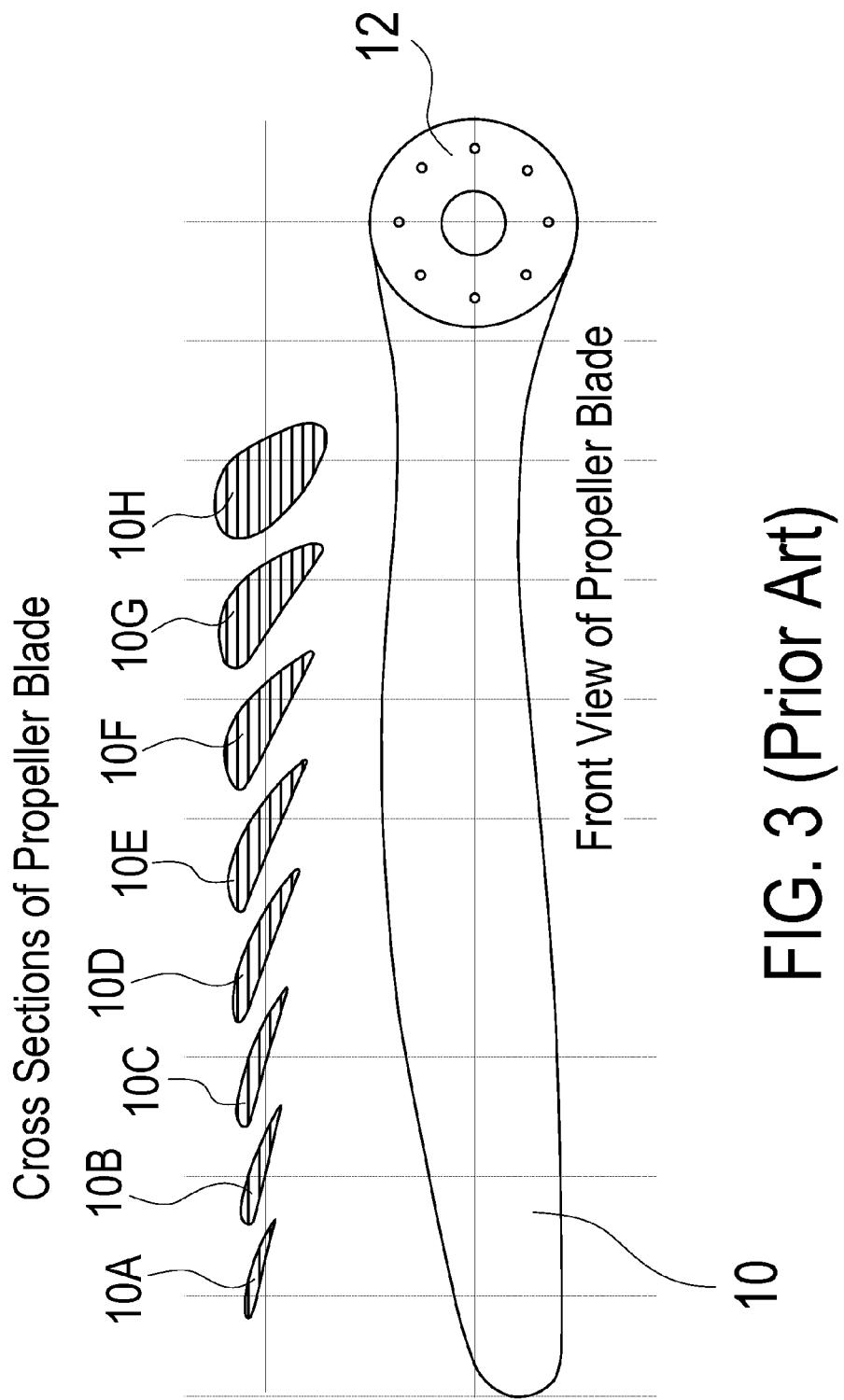
Figure 4:
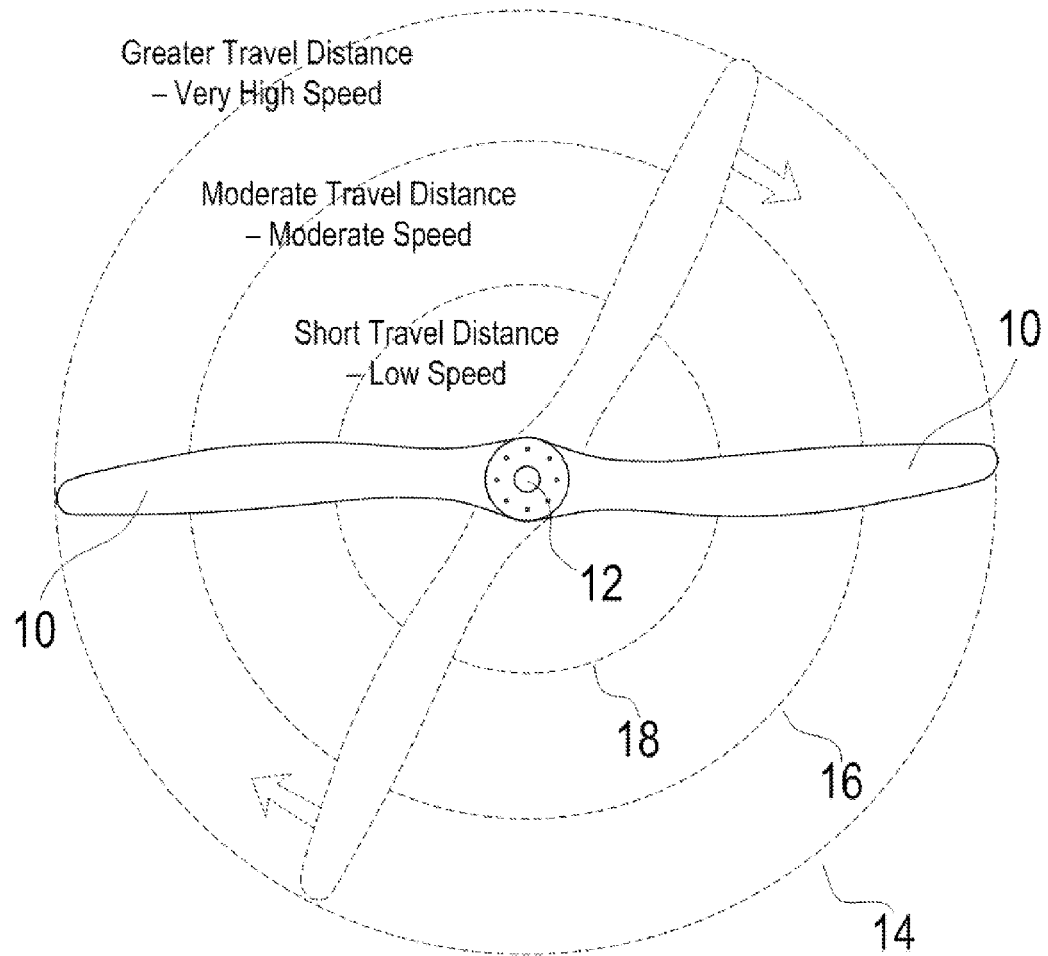

For the next part of the discussion on prior art propeller design, refer to both FIG. 3 and FIG. 4. FIG. 3 is a front view of a single airfoil from the prior art illustrated with diagrams showing the cross-sectional shape at different points along the blade, showing that the angle of attack of each cross section increases as the cross section moves closer to the center or hub of the propeller. A typical airfoil 10 from the prior art is essentially an airfoil in the same way that an aircraft wing is, except it is mounted such that it generates lift in the direction the aircraft is to be traveling (typically forward for a fixed wing aircraft, with the propeller or propellers mounted on the front). Two or more airfoils 10 are mounted on a circular hub 12. The blades 10 spin around the hub 12, which is driven (rotated) on a shaft by a large engine at a relatively high speed.

FIG. 4 is a front view of a full propeller from the prior art illustrating that the outer most parts of a propeller have to rotate faster than the inner most parts of a propeller, as they have a greater distance to travel for each revolution of the propeller. The tip of each blade 10 must travel the longest path 14 for each revolution, points in the middle of each blade 10 travel along a medium distance path 16, and points at the bottom of each blade 10, near the hub 12, travel a shorter path 18. Since points traveling along path 14 travel farther for each revolution than points at paths 16 and 18, they also travel considerably faster.

Because the different points along each blade 10 travel at different speeds, each different point along a blade 10 will have a slightly different critical angle of attack (because, as discussed previously, the speed of an airfoil through its medium affects the critical angle of attack). Therefore, different points along the blade 10 will have a different cross-sectional shape based on the critical angle of attack differences seen along these different points.

Returning to FIG. 3, the cross-sectional shapes 10A through 10H are shown directly above the spot in blade 10 for which they correspond. Section 10A, nearest to the outer-most, or fastest-moving, point of the blade 10, is designed to have a low angle of attack and a thin profile. Each section to the right, from 10B to 10C, 10D, 10E, 10F, 10G, down to 10H, has an increasing angle of attack and an increasing profile, with Section 10H having the largest angle of attack (which, at the lowest rotational speed relative to Sections 10A through 10G, it is best equipped to sustain) and the largest profile. Each section in the prior art blade 10 is designed such that it maximizes the lift at the speed corresponding to that rotational point on the propeller.

Having discussed airfoil design as it exists in the prior art through the use of FIGS. 1A through 4 as a means of providing background, we will now shift to the description of the present invention for the remaining figures, FIGS. 5 through 10. It was important to provide the background of prior art airfoil design to show the stark contrast of the present invention to the prior art, and to illustrate that the prior art actually taught away from the principles on which the present invention is based. While prior art design relied on creating an airfoil with a low angle of attack (typically less than 15 degrees) and on preventing the separation of air flow on the top side of the airfoil, it will be shown that the present invention actually performs best with a high angle of attack (typically, but not limited to, 45 degrees) and the full separation of air flow on the top side of the airfoil to achieve lift performance which exceeds that of airfoil designs in the prior art.

Figure 5:
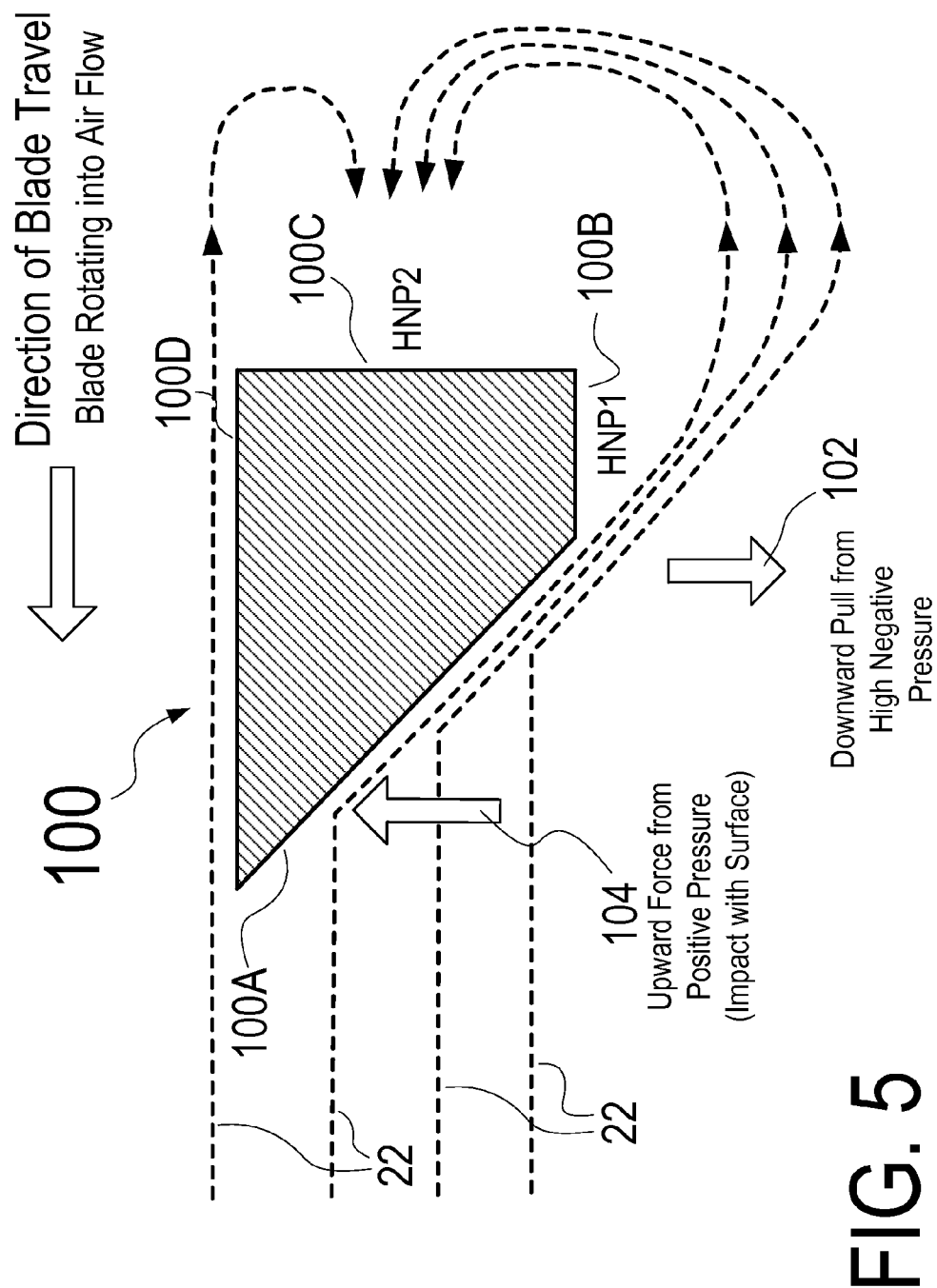
FIGS. 5 through 10 are provided to describe the present invention, which is a new propeller design with advantages over the propellers of the prior art.
Figure 6:
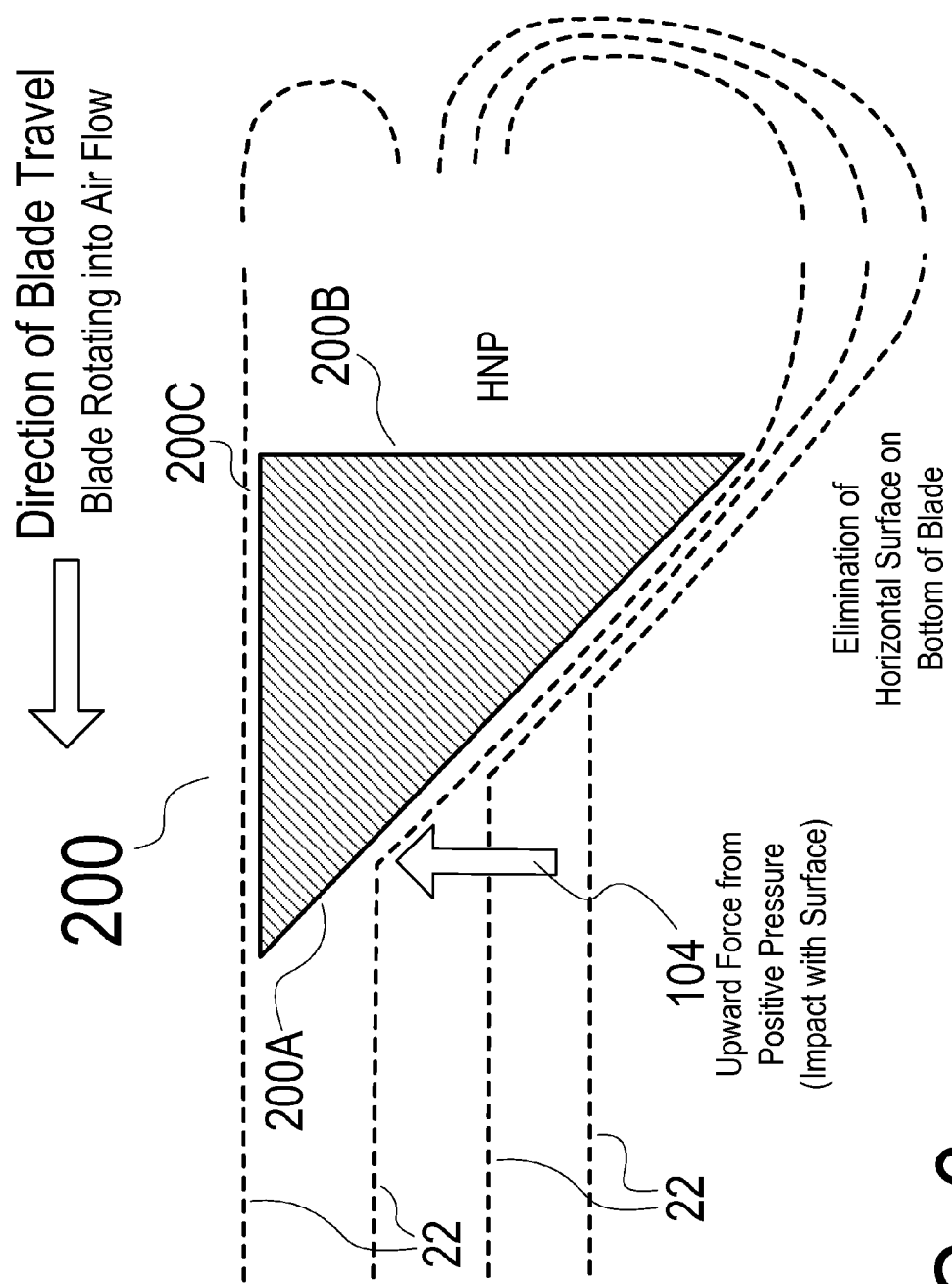

It should be noted that FIGS. 5 and 6 represent evolutionary steps in design of a new airfoil design, and FIGS. 7, 8, 9, and 10 represent the preferred embodiment of the propeller design of the present invention. However, the blade cross sections shown in FIGS. 5 and 6 contain many of the key inventive features of the present invention and detail important advances in the art in themselves.

FIG. 5 shows a cross section of one embodiment of a new airfoil design of the present invention in which the blade design has a reactionary front face which pushes into the air to create positive pressure on the front face when the air strikes the front face.

The cross section of a new blade design 100 is trapezoidal in shape, with a bottom surface 100B and top surface 100D roughly parallel to each other and to the flow of air 22. A reactionary front face 100A is placed at a high angle of attack relative to the air flow 22. This angle of attack can be adjusted as needed to meet the specific thrust and efficiency requirements of the propeller, but would likely be greater than 15 degrees and less than 85 degrees, with a typical value of around 45 degrees. A rear blade face 100C is substantially vertical in relation to the flow of air 22.

As the blade 100 moves (direction of movement is assumed to be toward the left side of FIG. 5), the flow of air 22 strikes the front face 100A of blade 100 and the surface of the front face 100A forces the air down toward bottom face 100B. This downward push of the air flow 22 (the "action") causes an equal and opposite "reaction", which is a positive, upward force on the blade 104 (lift) which works to pull the blade 100 up. It should again be noted that the designations of upward and downward are relative terms based on the orientation of FIG. 5 and other similar figures in this application, and that upward force 104 could be acting to pull an aircraft forward (that is, parallel to the surface of the Earth, as opposed to away from the surface) if we assume the propeller is mounted on the front of an aircraft.

The flow of air 22 continues down the front face 100A of blade 100 and out around bottom face 100B. The flow of air 22 does not follow the surface of bottom face 100B but is instead forced past it and overshoots it. This creates a temporary vacuum and an area of high negative pressure HNP1 beneath bottom face 100B. This area of high negative pressure HNP1 beneath bottom face 100B creates a downward force 102 which at least partially counteracts the upward force 104 generated from the impact of the air flow 22 with the reactionary front face 100A. It is because of this downward force 102 that blade cross section 100 as shown in FIG. 5 is not a preferred embodiment of the present invention.

Finally, as blade 100 moves through the air flow 22 in the direction of front face 100A, a second area of high negative pressure HNP2 is created just behind rear face 100C. This effect is easily reproduced in water when one dips a hand in the water and then drags the hand very quickly from one point in the water to another. If you move your hand quickly enough, a void is produced in the wake immediately following your hand when the water does not move quickly enough to fill the gap left behind as your hand moves forward. This second area of high negative pressure HNP2 also creates a pulling force on the blade, but only in a direction perpendicular to the upward force 104, not in direct opposition to it, so it can be dismissed.

FIG. 6 shows a cross section of a second embodiment of a new airfoil design of the present invention in which the blade design has a reactionary front face but which eliminates an area of negative pressure that constrained the design shown in FIG. 5, and therefore represents an improvement over the blade design in FIG. 5.

The cross section of blade design 200 is triangular in shape. Blade 200 still has a reactionary front face 200, similar to the design of FIG. 5, but the bottom horizontal surface from the previous blade design (in FIG. 5) has been eliminated. Blade design 200 offers a significant improvement in lift over blade design 100 through the elimination of the horizontal surface (100B in FIG. 5), which also resulted in the elimination of the corresponding area of high negative pressure HNP1 that was associated with and acting upon surface 100B. Since there is no "bottom side" to blade 200, and no corresponding zone of high negative pressure underneath blade 200, there is also no resulting downward force created to counteract upward force 104. The net amount of upward force for the system is significantly increased, and blade 200 generates significantly more lift than blade 100 as a result.

Test results using two different propeller designs, one using a blade with a cross section matching blade 100 from FIG. 5, and one using a blade with a cross section matching blade 200 from FIG. 6, were completed to see how much lift was generated. The total diameter of each propeller was 2.0 feet. The two test propellers (we shall refer to them herein as Prop 100 for the propeller matching the cross section in FIG. 5, and Prop 200 for the one matching FIG. 6) were spun on a test fixture at varying speeds (revolutions per minute, or RPM) and measurements of the amount of lift generated were taken for both Prop 100 and Prop 200 at several different speed points for comparison.

Prop 100 generated almost no lift at all at any rotation speed, and was seen as a practical failure. The presence of the zone of high negative pressure HNP1 on the bottom surface 100B of this propeller appeared to have effectively cancelled out any upward force 104 generated from the interaction of the air flow 22 with the front face 100A.

By contrast, Prop 200 generated 17.5 pounds (lbs.) of force. The elimination of the area of high negative pressure on the bottom side of the blade allowed for a significant increase in the amount of lift generated. It should be noted that this amount of lifting force was generated at a very high rotational speed of nearly 4100 RPM. A typical aircraft engine will operate around 2100 to 2500 RPM, and most conventional propeller designs in the prior art will not perform well at these high speeds, because their traditional "aerodynamic" designs will produce a lot of drag once the blade tips exceed the speed of sound. The present invention works best when rotated at a high rotational speed. The airfoil design of the present invention is not affected negatively by the turbulent air that is generated when the sound barrier is generated, and thus the performance continues to increase.

However, it should also be noted that a propeller using the airfoil design of the present invention will offer an improvement over a traditional propeller design of the prior art even at the lower operating speeds of 2100 to 2500 RPM. This improvement is approximately 10 percent increase in lift/power over a prior art propeller even at conventional speed.

FIGS. 7 through 10 illustrate the preferred embodiment of a new airfoil design of the present invention, in which an additional evolutionary step beyond the design presented in FIG. 6 is provided to maximize the amount of lift generated. This step is the inclusion of a vacuum-producing face directly opposite the reactionary front face that creates a high negative pressure zone on top of the blade, creating a pulling force that reinforces the positive pushing force generated on the front face.

Figure 7:
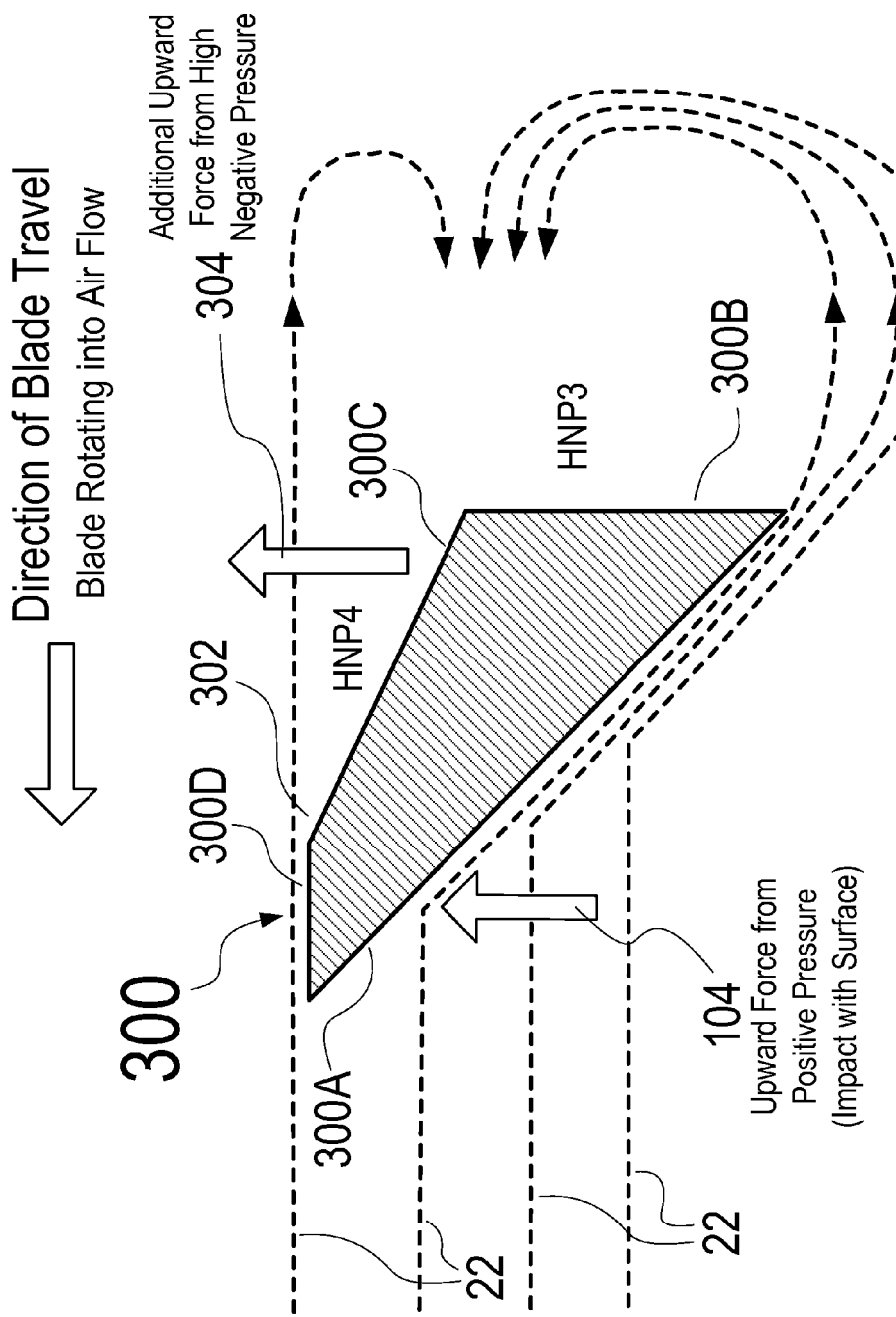

FIG. 7 shows a cross section of the preferred embodiment of the airfoil design of the present invention. Blade cross section 300 has a reactionary front face 300A which pushes into the flow of air 22 to create positive pressure by deflecting the flow of air 22 downward, creating a resulting opposite reactionary force (by Newton's Third Law of Motion) that pushes the blade 300 upward. Like the previous design shown in FIG. 6, blade 300 does not have a horizontal face on the bottom side, and has a back face 300B that is perpendicular or nearly perpendicular to the flow of air 22 and a top face 300D that is parallel or nearly parallel to the flow of air 22. However, in order to maximize the lifting force, the design of blade 300 introduces a vacuum-producing face 300C. Vacuum face 300C is angled such that it typically forces a separation of air (that is, where the flow of air 22 pulls away from the vacuum face 300C and returns to mostly horizontal flow instead of staying close to the surface of vacuum face 300C) to occur at or near the point where top face 300D meets vacuum face 300C (shown in FIG. 7 has point of separation 302). The actual angle of down slant of vacuum face 300C may be adjusted to any angle off of horizontal as appropriate to meet the lift and efficiency requirements for the propeller design, but a study of traditional aerodynamics suggest that an angle approaching 15 degrees or greater may produce the required separation of air, as this is the approximate angle of attack in traditional airfoil design when separation and stall starts to occur. However, this suggestion is not meant to be limiting, as the propeller design of the present invention is intended to be operated at a much higher rotational speed, and the critical angle of attack (when separation occurs and stall begins) is affected by speed of movement through the medium as well as airfoil design.

An area of high negative pressure HNP4 is generated above vacuum face 300C when separation of the air flow 22 occurs, creating an additional upward force 304 which combines with upward force 104 to generate a maximum lift force.

Since the blade 300 is traveling (rotating) at a high rate of speed, the flow of air 22 moves above and around vacuum face 300C and around and below front face 300A and circulates back into the zone of high negative pressure HNP3 that exists behind back face 300B. Although zone HNP3 creates a backwards force opposing the forward movement of the blade (creating drag on the blade), HNP3 does not create any additional downward force that works against the combined upward forces 104 and 304, and lift is maximized.

Figure 8:
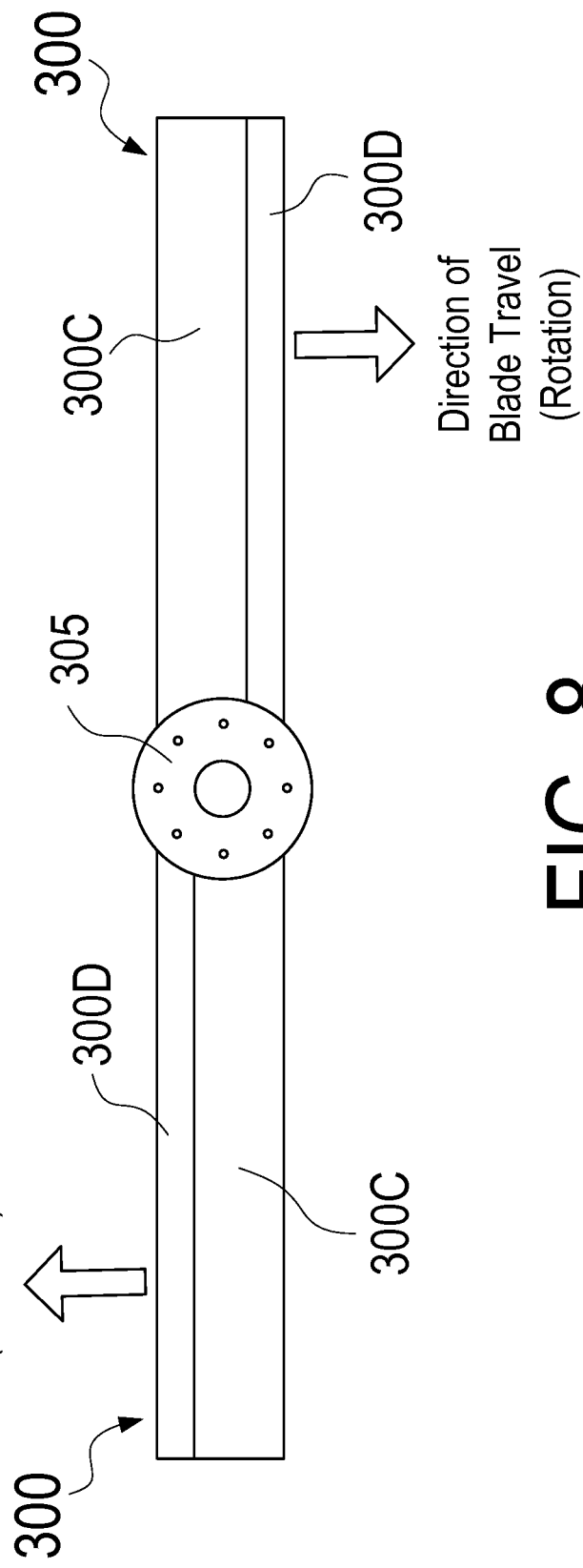

FIG. 8 is a front view of the preferred embodiment of the propeller design of the present invention. Two or more blades 300 are mounted on a hub 305 such that they are facing opposite directions. When the propeller is mounted to a shaft (such as that on a aircraft engine), the two blades 300 spin in opposite directions such that front face 300A (not visible here) of each blade 300 will be the leading edge of the airfoils. Visible in this front view of the propeller are the top face 300D and vacuum face 300C.

Figure 9:
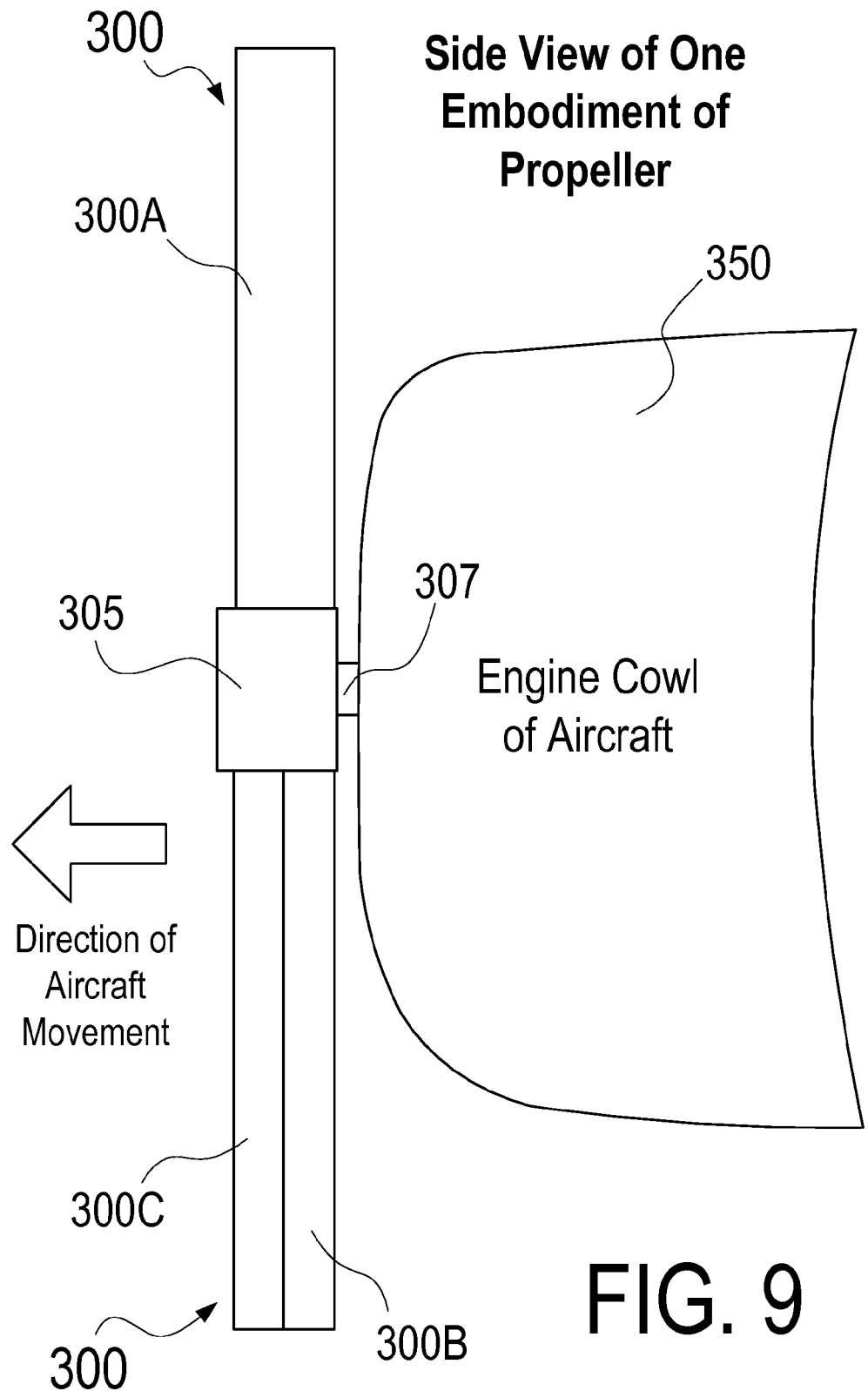

FIG. 9 is a side view of the preferred embodiment of the propeller design of the present invention as it might be mounted on an aircraft in front of the engine cowl. In this orientation, we see one blade 300 mounted on one side of the hub 305 and facing such that we can see front face 300A, and the other blade 300 mounted on the other side of hub 305 and positioned such that we can see back face 300B and vacuum face 300C. The propeller hub 305 is connected by a shaft 307 to the aircraft engine (hidden behind the engine cowl 350).

Figure 10:
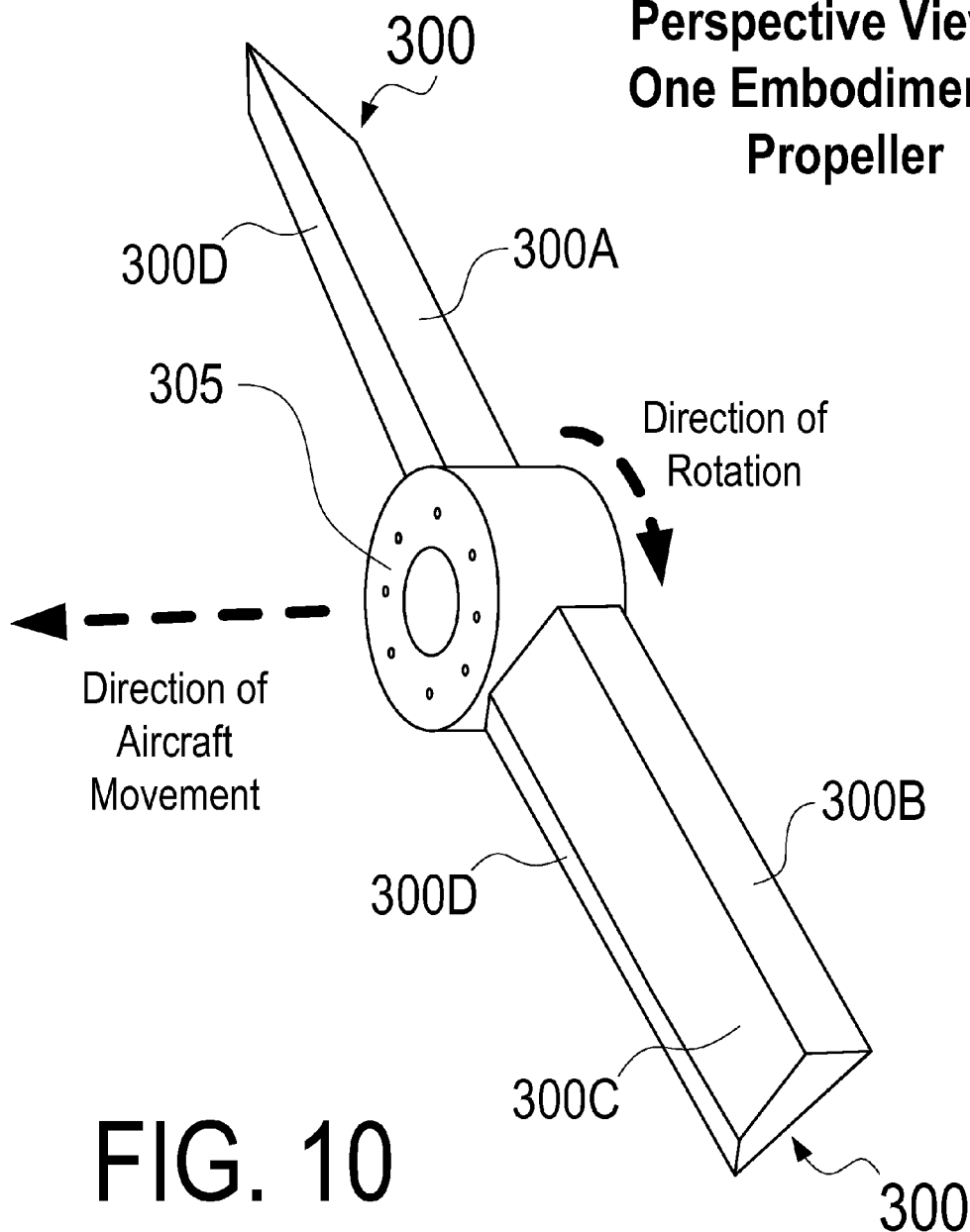

Finally, FIG. 10 is a perspective view of the preferred embodiment of the propeller design of the present invention. This view is provided primarily to increase the understanding of the invention. The blades 300 are mounted on a central hub 305 such that they are opposing each other. When the propeller rotates in the direction indicated in FIG. 10, front face 300A, shown in the upper portion of the illustration, would move in the direction of rotation (up out of the drawing page) and back face 300B shown in the lower portion of the illustration would move down into the drawing page.

When testing was done on the preferred embodiment of the propeller design (which we shall refer to as Prop 300, based on the design illustrated in FIGS. 7-10), the performance was improved significantly over that shown by the testing of Prop 200 as previously described in this document. Under the same conditions where Prop 200 generated 17.5 lbs. of lifting force, a 2-foot model of Prop 300 was demonstrated to have generated 27.5 lbs. of lifting force.

Through mathematical modeling and analysis, we can extrapolate that, if we were to create a propeller that was 5 feet in diameter instead of 2 feet in diameter, the resulting lift generated would be 1,431 lbs. of force at 4,200 RPM, and 1,741 lbs. of force at 5,200 RPM. A winning entry in a typical lift competition for propeller-driven aircraft is a propeller that generates 350 lbs. of force from a 115 horsepower engine. This novel airfoil design described in the present invention represents almost a 5-fold increase in lift over a competition winning propeller design from the prior art. Obviously, any calculation of thrust depends on a number of factors, including engine horsepower, propeller diameter, blade pitch, etc., but the design of the present invention will deliver approximately a 10 percent increase in performance or greater when run at conventional aviation RPM over traditional airfoil designs, and performance several times that of a traditional design when operated at higher RPM (above 4000 RPM).

Having described the preferred embodiment, it will become apparent that various modifications can be made without departing from the scope of the invention as defined in this document. In particular, the construction of the airfoils may be varied in various ways, as long as the general concept of including a reactionary front face with a high angle of attack and a vacuum-producing face opposing the front face is preserved. The material used for the blades may be any material appropriate to the construction of an object that will be subjected to the stresses associated with a relatively high rotational speed and the conditions typically seen by high-performance propellers. The blades may be hollow or solid, or contain additional elements such as fins or other aerodynamic features. The blades may have holes, slots, or areas of missing material as appropriate to adjust performance attributes in various situations and environments, as long as they conform to the basic inventive premise captured herein. The blades of the propeller may be any appropriate length, and the number of blades on a propeller may be any appropriate number of blades.

The propeller designs shown in FIGS. 5-10, and in particular 7-10, may also be applied to other airfoils such as aircraft wings as appropriate. The same design concepts presented herein which provide lift to the described propeller designs should work for airfoils on aircraft wings or helicopter blades, assuming the wings or blades can be operated or pushed through an air flow at a high enough rate of speed to take advantage of the unique lift forces generated by the designs of the present invention at high speeds.

The exact dimensions of the four faces (300A, 300B, 300C, and 300D) and the exact angles between them can be varied significantly and should be, such that the optimal performance characteristics can be identified for each application of the propeller design. The key inventive concepts that must be met are (1) the inclusion of a reactionary front face that pushes into the flow of air with a high angle of attack (typically greater than 15 degrees), (2) the inclusion of a vacuum-producing face which forces the early separation of the flow of air from the top contour of the airfoil, thereby creating an area of high negative pressure which pulls upward, contributing to lift, and (3) the elimination of any primarily horizontal surfaces on the bottom side of the airfoil, eliminating areas of high negative pressure which might pull downward, fighting against lift.

Finally, it should be noted that it is possible to create a blade with an adjustable shape and cross section design, such that the angles and face dimensions can be modified in flight or right before a flight to optimize lift or other performance attributes. One possible embodiment of this concept would be to construct the blade out of hinged sections of sheet material that can be moved in relation to each other to create enclosed spaces of varying sizes and volumes.

The invention claimed is:

1. An airfoil comprising a reactionary face, a top face, a vacuum-producing face, and a back face,
   wherein said reactionary face is positioned with a high angle of attack on a first side of said airfoil that first encounters a flow of air when said airfoil is traveling into said flow of air, whereby an impact of said flow of air with said reactionary face causes said flow of air to be deflected downward, generating an opposite lifting force on said airfoil in an upward direction;
   wherein said top face is positioned on a second side of said airfoil that is adjacent to said first side, wherein said second side is substantially parallel to said flow of air, and wherein said second side is facing in the direction said opposite lifting force is acting;
   wherein said vacuum-producing face is positioned on a third side of said airfoil that is adjacent to said second side, wherein said third side is positioned with respect to said second side at an angle such that as said flow of air passes from a transition from said second side to said third side, said flow of air will separate from said third side instead of flowing along said third side, whereby said separation of air from said third side will generate an area of high negative pressure immediately above said third side, whereby said third side will be pulled toward said area of high negative pressure, generating an additional reinforcing lifting force on said airfoil;
   wherein said back face is positioned on a fourth side of said airfoil, wherein said fourth side is between said vacuum-producing face and said reactionary face, wherein said fourth side is substantially vertical, wherein said fourth side is positioned such that it is facing in a direction opposite of and substantially perpendicular to said flow of air; and
   wherein there exists no face on said airfoil that contributes to a force that is substantially opposed to a combined lifting force generated by said reactionary face and said vacuum-producing face.

2. The airfoil of claim 1 in which an angular relationship between adjacent sides of said airfoil can be modified, whereby one or more of the operational characteristics of the airfoil is affected.

3. The airfoil of claim 1 in which at least one dimension of at least one side of said airfoil can be modified, whereby one or more of the operational characteristics of the airfoil is affected.

4. A propeller comprising two or more blades, each of said blades comprising a reactionary face, a top face, a vacuum-producing face, and a back face,
   wherein said reactionary face is positioned with a high angle of attack on a first side of said blade that first encounters a flow of air when said blade is traveling into said flow of air, whereby an impact of said flow of air with said reactionary face causes said flow of air to be deflected downward, generating an opposite lifting force on said blade in an upward direction;
   wherein said top face is positioned on a second side of said blade that is adjacent to said first side, wherein said second side is substantially parallel to said flow of air, and wherein said second side is facing in the direction said opposite lifting force is acting;
   wherein said vacuum-producing face is positioned on a third side of said blade that is adjacent to said second side, wherein said third side is positioned with respect to said second side at an angle such that as said flow of air passes from a transition from said second side to said third side, said flow of air will separate from said third side instead of flowing along said third side, whereby said separation of air from said third side will generate an area of high negative pressure immediately above said third side, whereby said third side will be pulled toward said area of high negative pressure, generating an additional reinforcing lifting force on said blade;
   wherein said back face is positioned on a fourth side of said blade, wherein said fourth side is between said vacuum-producing face and said reactionary face, wherein said fourth side is substantially vertical, wherein said fourth side is positioned such that it is facing in a direction opposite of and substantially perpendicular to said flow of air; and
   wherein there exists no face on said blade that contributes to a force that is substantially opposed to a combined lifting force generated by said reactionary face and said vacuum-producing face.

5. The propeller of claim 4 in which an angular relationship between adjacent sides of said blade can be modified, whereby one or more of the operational characteristics of the blade is affected.

6. The propeller of claim 4 in which at least one dimension of at least one side of said blade can be modified, whereby one or more of the operational characteristics of the blade is affected.

* * * * *